US012132255B2

(12) United States Patent
Tienda Herrero et al.

(10) Patent No.: US 12,132,255 B2
(45) Date of Patent: Oct. 29, 2024

(54) MULTIBEAM ANTENNA

(71) Applicant: Airbus Defence and Space Limited, Stevenage (GB)

(72) Inventors: Carolina Tienda Herrero, Portsmouth (GB); Simon Stirland, Portsmouth (GB); Sonya Amos, Portsmouth (GB); Glyn Thomas, Portsmouth (GB); Winston Ramsey, Portsmouth (GB)

(73) Assignee: Airbus Defence and Space Limited, Stevenage (GB)

( * ) Notice: Subject to any disclaimer, the term of this patent is extended or adjusted under 35 U.S.C. 154(b) by 0 days.

(21) Appl. No.: 17/782,681

(22) PCT Filed: Nov. 30, 2020

(86) PCT No.: PCT/EP2020/083952
§ 371 (c)(1),
(2) Date: Jun. 6, 2022

(87) PCT Pub. No.: WO2021/121936
PCT Pub. Date: Jun. 24, 2021

(65) Prior Publication Data

US 2023/0036249 A1 Feb. 2, 2023

(30) Foreign Application Priority Data

Dec. 19, 2019 (EP) .................................... 19275152

(51) Int. Cl.
*H01Q 19/17* (2006.01)
*H01Q 1/28* (2006.01)
(Continued)

(52) U.S. Cl.
CPC ............... *H01Q 19/17* (2013.01); *H01Q 3/20* (2013.01); *H01Q 15/16* (2013.01); *H01Q 21/06* (2013.01); *H01Q 1/28* (2013.01)

(58) Field of Classification Search
CPC ............ H01Q 1/28; H01Q 3/20; H01Q 15/16; H01Q 19/17; H01Q 21/06; H04B 7/2041
See application file for complete search history.

(56) References Cited

U.S. PATENT DOCUMENTS 4,989,011 A * 1/1991 Rosen .................... H01Q 25/04 342/373
6,018,316 A 1/2000 Rudish
(Continued)

OTHER PUBLICATIONS

Xiong Zi-Yuan et al: "Beamforming Properties and Design of the Phased Arrays in Terms of Irregular Subarrays;" IET Microwaves, Antennas & Propogation, the Institution of Engineering and Technology, United Kingdom; vol. 9, No. 4; Mar. 19, 2015 (Mar. 19, 2015), pp. 369-379; XP006051582; ISSN: 1751-8725; DOI: 10.1049/IET-MAP.2014.0308; figures 1C, 3b; section 2.1, 3.2.
(Continued)

*Primary Examiner* — Graham P Smith
*Assistant Examiner* — Amal Patel
(74) *Attorney, Agent, or Firm* — Nelson Mullins Riley & Scarborough LLP

(57) ABSTRACT

A multibeam antenna is provided comprising a direct radiating array, DRA, and a reflector arranged to reflect signals radiated from the DRA in a transmission mode and to reflect signals to the DRA in a reception mode. The antenna is a very high throughput satellite (VHTS) antenna providing global coverage with narrow, high gain beams.

12 Claims, 9 Drawing Sheets

(51) Int. Cl.

| | |
|---|---|
| ***H01Q 3/20*** | (2006.01) |
| ***H01Q 15/16*** | (2006.01) |
| ***H01Q 21/06*** | (2006.01) |

(56) References Cited

U.S. PATENT DOCUMENTS

| | | | | |
|---|---|---|---|---|
| 6,268,835 | B1 | 7/2001 | Toland | |
| 8,077,109 | B1* | 12/2011 | Roberts | H01Q 21/08 716/110 |
| 2019/0115975 | A1* | 4/2019 | Freedman | H01Q 15/16 |
| 2019/0123813 | A1* | 4/2019 | Mendelsohn | H04B 7/18517 |
| 2020/0274611 | A1* | 8/2020 | Mendelsohn | H01Q 1/288 |
| 2020/0322043 | A1* | 10/2020 | Thain | B64G 1/1007 |
| 2021/0249788 | A1* | 8/2021 | Saitto | H01Q 3/20 |
| 2022/0181787 | A1* | 6/2022 | Taylor | H01Q 1/288 |

OTHER PUBLICATIONS

Feb. 19, 2021 Search Report issued in International Patent Application No. PCT/EP2020/083952.

Feb. 19, 2021 Written Opinion of the International Searching Authority issued in International Patent Application No. PCT/EP2020/083952.

The Basics of Digital and Analog Beamforming with Phased Arrays; *Cadence System Analysis*; retrieved Feb. 9, 2024 from https://resources.system-analysis.cadence.com/blog/the-basics-of-digital-and-analog-beamforming-with-phased-arrays.

Chaudhari; "What is the Difference between Analog, Digital and Hybrid Beamforming;" *Wireless Pi: Discover the Joy of Signals, DSP and Wireless Communications*; retrieved Feb. 9, 2024 from https://wirelesspi.com/what-is-the-difference-between-analog-digital-and-hybrid-beamforming/.

Montesinos et al.; "Adaptive beamforming for large arrays in satellite communications systems with dispersed coverage"; 2011; pp. 350-361; vol. 9; No. 3; IET Communications, France.

* cited by examiner

MULTIBEAM ANTENNA

CROSS-REFERENCE TO RELATED APPLICATIONS

This application claims priority to and is a 35 U.S.C. § 371 U.S. National Stage Application of International Application No. PCT/EP2020/083952, entitled "MULTIBEAM ANTENNA", filed Nov. 30, 2020, which claims priority to European Application No. 19275152.7, entitled "MULTIBEAM ANTENNA", filed Dec. 19, 2019, the contents of each being incorporated by reference herein in its entirety.

TECHNICAL FIELD

The present invention relates to a multibeam antenna. In particular, the present invention relates to a multibeam antenna comprising a direct radiating array.

BACKGROUND ART

A direct radiating array (DRA) antenna employs an array of transmit and receive elements. Analogue beam forming networks control the antenna elements to achieve beam steering, enabling highly flexible multibeam transmission and reception, with high gain beams.

Space telecommunications systems continuously increase their capacity to cover the needs of multibeam antenna schemes, with narrower beam width (e.g. 0.13°) and wider is scanning angles, sometimes to provide coverage to the whole Earth.

The directivity and half power beamwidth available when using a DRA are limited by the aperture size of the array which can be accommodated in the available space of the spacecraft. For very narrow and highly directive beams, large and heavy arrays are required.

Conventionally, antennas implemented with DRA technology must overcome two main problems—the accommodation of the large feed array, and grating lobe mitigation, arising due to the periodic nature of the elements of the DRA.

SUMMARY OF INVENTION

Embodiments of the present invention aim to address these problems by using a parabolic reflector fed with a DRA.

This reduces the size of the array required to provide narrow, high gain beams. Polyomino tiling can be used, arranged in a non-periodic configuration to reduce grating lobes, while reducing the number of inputs for the digital beam forming processor.

According to an aspect of the present invention, there is provided a multibeam antenna is provided comprising a direct radiating array, DRA, and a reflector arranged to reflect signals radiated from the DRA in a transmission mode and to reflect signals to the DRA in a reception mode. The antenna is a very high throughput satellite (VHTS) antenna providing global coverage with narrow, high gain beams.

The DRA may comprise a plurality of elements grouped into a plurality of polyomino-shaped subarrays.

Each sub-array may be irregular in shape, and may have an arbitrary orientation, wherein the plurality of sub-arrays are arranged to form a rectangular shape.

The multibeam antenna may comprise an analogue beam forming network for directing a beam coverage area within a directional coverage area, and a digital beam forming network for optimising the direction of the narrow beams within the beam coverage area.

The multibeam antenna may further comprise mechanical steering means for repositioning the reflector.

The multibeam antenna may comprise a feed array between the DRA and the reflector comprising a plurality of feed horns, each of which may be activated simultaneously.

BRIEF DESCRIPTION OF DRAWINGS

Embodiments of the present invention are described below, by way of example only, with reference to the accompanying drawings, of which.

DETAILED DESCRIPTION

Figure 1:
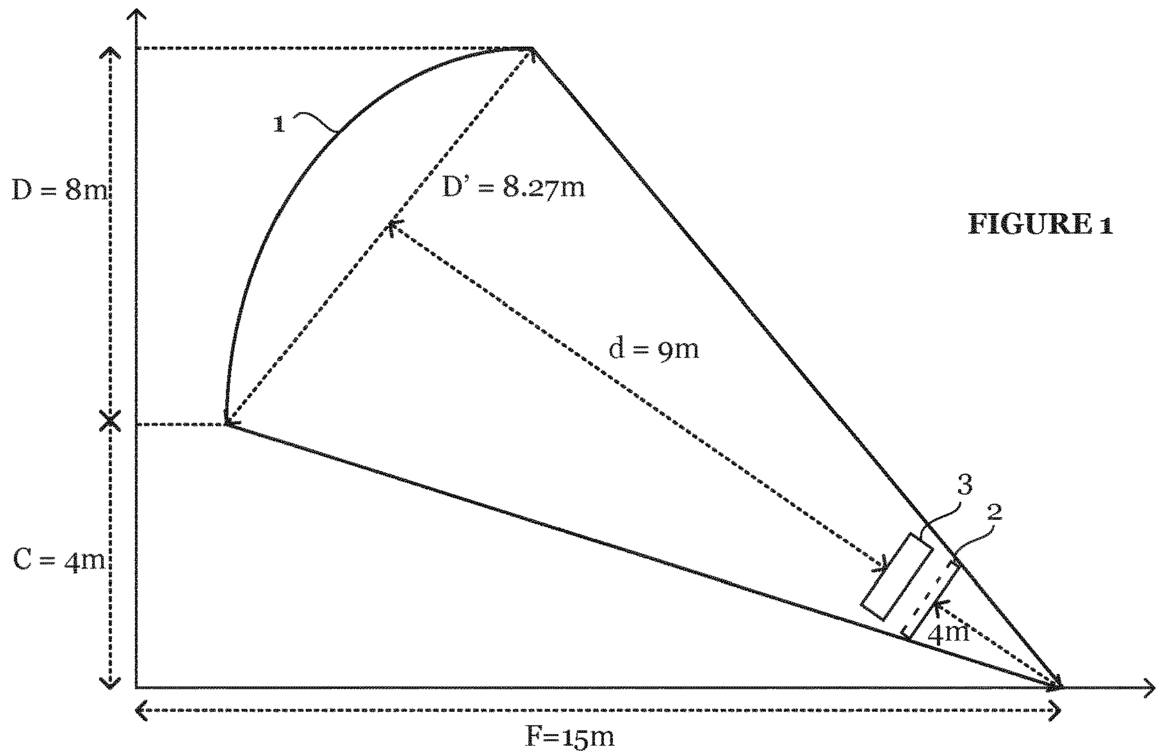
FIG. 1 illustrates an antenna according to an embodiment of the present invention.

FIG. 1 illustrates an antenna according to an embodiment of the present invention. For ease of illustration, the components of FIG. 1 are not illustrated to scale. The antenna comprises a DRA 2 of transmit and receive elements, and a parabolic reflector 1. The parabolic reflector 1 is of the form known in the art. The elements of the DRA 2 are of a structure to enable transmission and/or reception of signals, such as radio frequency signals, of a type (such as a power level and content) required by a particular application. The layout and control of the DRA elements is described in more detail below.

According to the scheme of the antenna geometry of the embodiment of FIG. 1, the parabolic reflector 1 has a diameter D of 8 m, and with aperture diameter D'=8.27 m and a focal length F of 15 m, with 4 m clearance, C. The DRA 2 is positioned within the focal point of the reflector 1, with 4 m of defocus. This configuration leads to a magnification factor of 4.

The DRA 2 has 1,024 elements which are controlled in accordance with transmission and reception circuitry (not shown) to transmit and/or receive signals in dual polarization (horizontal and vertical). The DRA 2 interfaces with an array 3 of 1,024 corresponding conical feed horns, positioned between each element and the reflector 1, at a distance, d, of 9 m. The feed horns have diameter 50.3 mm, arranged as a rectangular lattice of 32×32 horns. The feed horns are organized to provide an interface to 64 'L'-shaped subarrays or 'tiles' of the DRA 2, in which each subarray comprises 16 transmit/receive elements.

All of the feed horns within the feed array are activated at the same time in order to produce a certain beam of the beam layout.

Figure 2:
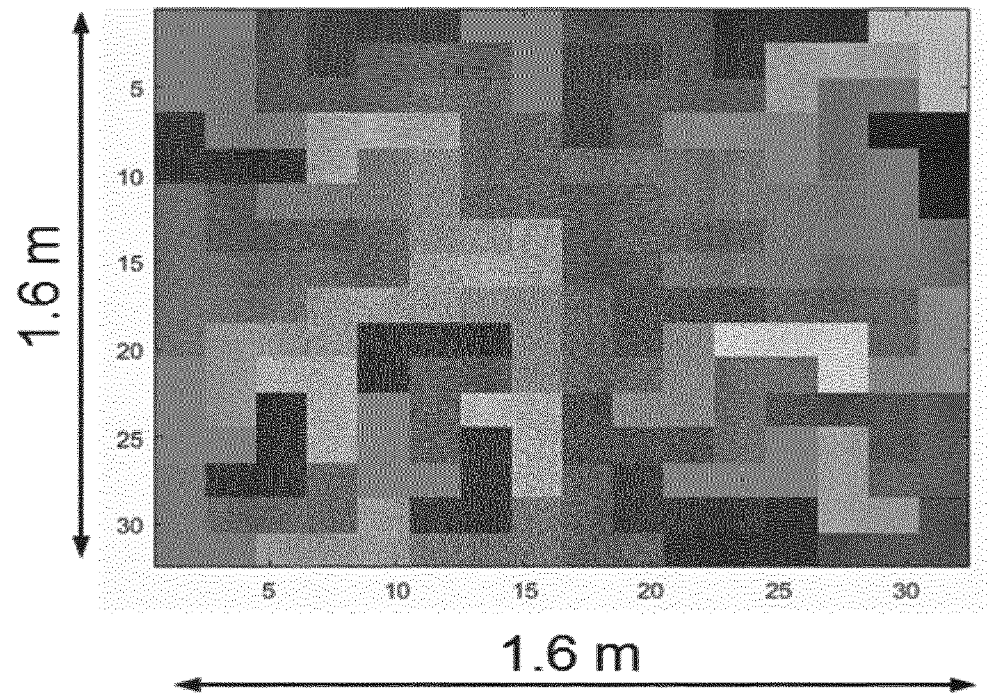
FIG. 2 illustrates beam forming network arrangement according to an embodiment of the present invention.

FIG. 2 illustrates the tessellation of the 'L'-shaped subarrays of the feed array having a random orientation, according to an embodiment of the present invention, for an array of 1.6 m×1.6 m. An index of the elements from 0-32, to illustrate correspondence with a feed horn, is shown on each axis. Such an array is referred to herein as a polyomino array. Each DRA element within a subarray is part of a group of elements which can be controlled collectively as well as individually, in a manner to be described in more detail below.

Figure 4:
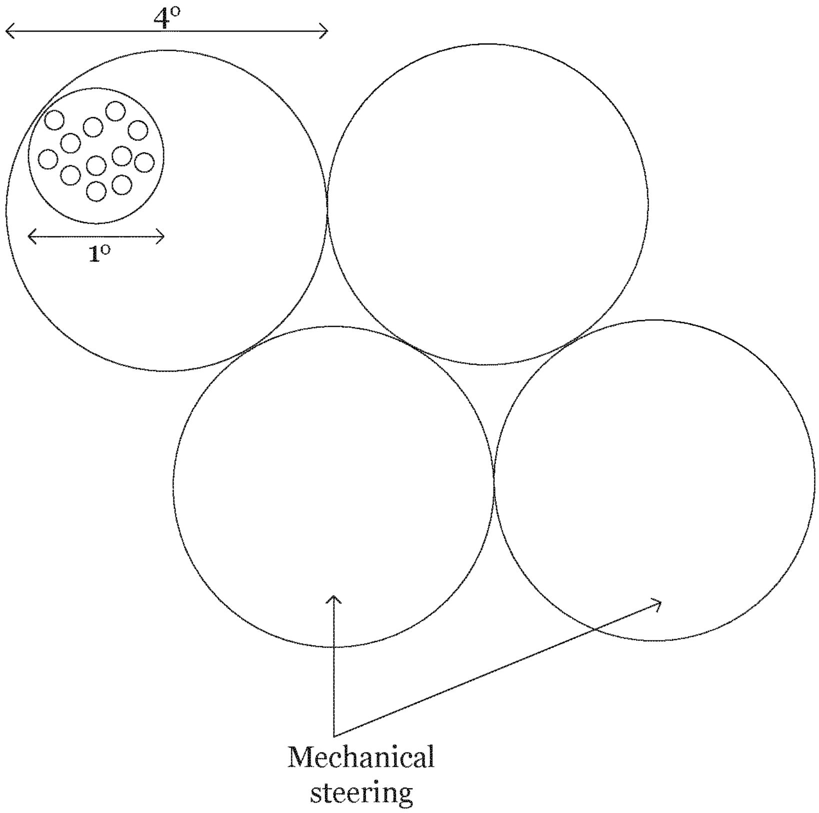
FIG. 4 illustrates an antenna coverage scheme achieved using an antenna implemented according to the configurations of FIGS. 1 to 3.

FIG. 4 illustrates an antenna coverage scheme achieved using an antenna implemented according to the configurations of FIGS. 1 and 2. Amplitude and phase coefficients are applied to the elements of the DRA via beam forming networks, and to the subarrays, to optimize the beam in a certain direction.

Firstly, element-level control is performed by combining the DRA elements of each subarray using analogue beam forming to direct the beams that populate a 4° diameter coverage, represented by a circular area in FIG. 4. The 4° circle is referred to herein as a "directional coverage area" representing an area within which a set of beams may be directed. The directed beams themselves cover a 1° diameter circle, referred to herein as a "beam coverage area" and comprises a set of narrow beams of half-power beamwidth 0.13° and directivity 60 dBi. Analogue beam forming is achieved using an analogue beam forming network (which may be included within the DRA housing or on a satellite payload hosting the DRA) to control the DRA elements using techniques known to those skilled in the art.

Secondly, subarray-level control is performed by computing amplitude and phase weights for each of the 64 subarrays using digital beam forming techniques to optimize the performance in directivity and carrier/interference (C/I) ratio for those beams within the 1° diameter circle shown in FIG. 4. Digital beam forming is achieved using a digital beam forming network (which may be included within the DRA housing or on a satellite payload hosting the DRA) to control the subarrays of the DRA using techniques known to those skilled in the art. Grouping the DRA elements into subarrays reduces the number of inputs to a processor of the digital beam forming network, since each input can be associated with a whole entire subarray, rather than an individual element. In the present embodiment, which has 1,024 elements, 1,024 inputs to the processor of the digital beam forming network could result in a very complex configuration. In the case where the elements are divided into 64 subarrays, as in the present embodiment, only 64 entries to the processor of the digital beam forming network are required.

The combination of analogue and digital beam forming techniques in this manner renders the antenna a hybrid antenna, and leads to two degrees of freedom. Element-level weighting is such that each narrow beam is pointed to the centre of the 1° circle, and the subarray-level control is such that the narrow beams are re-pointed to a direction within the 10 circle which optimizes performance.

Figure 3:
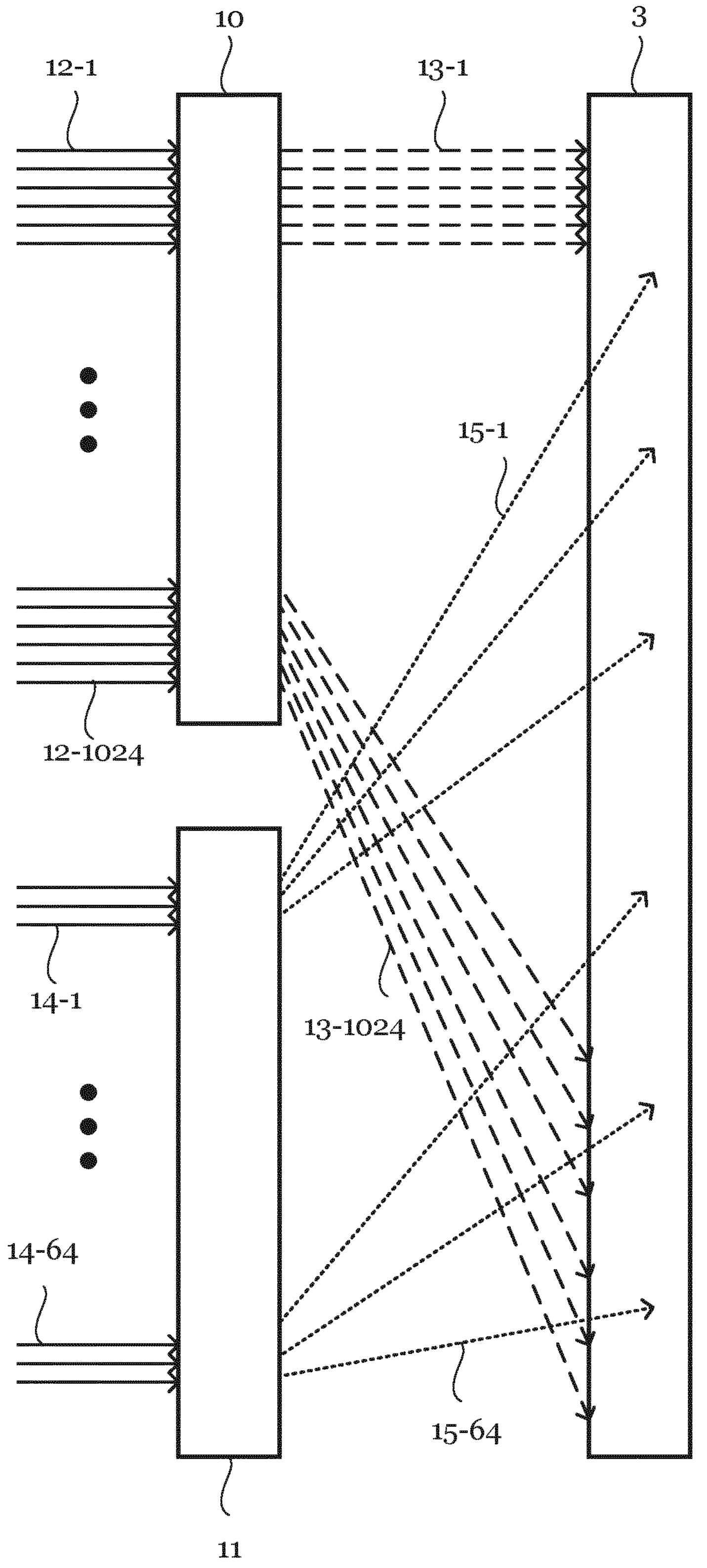
FIG. 3 illustrates a feed array layout according to an embodiment of the present invention.

FIG. 3 illustrates the configuration of beam forming networks according to the present embodiment. An analogue beam forming network 10 and a digital beam forming network 11 are shown which control the DRA 3. 1,024 control inputs 12-1, . . . , 12-1024 are provided from a processor (not shown) of the analogue beam forming network 10, representing information to enable the analogue beam forming network 10 to apply phase and gain coefficients to the DRA 3 via 1,024 control outputs 13-1, . . . , 13-1,024. 64 control inputs 14-1, . . . , 14-64 are provided from a processor (not shown) of the digital beam forming network 11, representing information to enable the digital beam forming network 11 to apply phase and gain coefficients to subarrays of elements of the DRA 3 via 64 control outputs 15-1, . . . , 15-64. The control outputs 15-1, . . . , 15-64 are provided to a subarray addressing module (not shown) which co-ordinates distribution of control signals to all of the elements within the subarray.

Figure 5A:
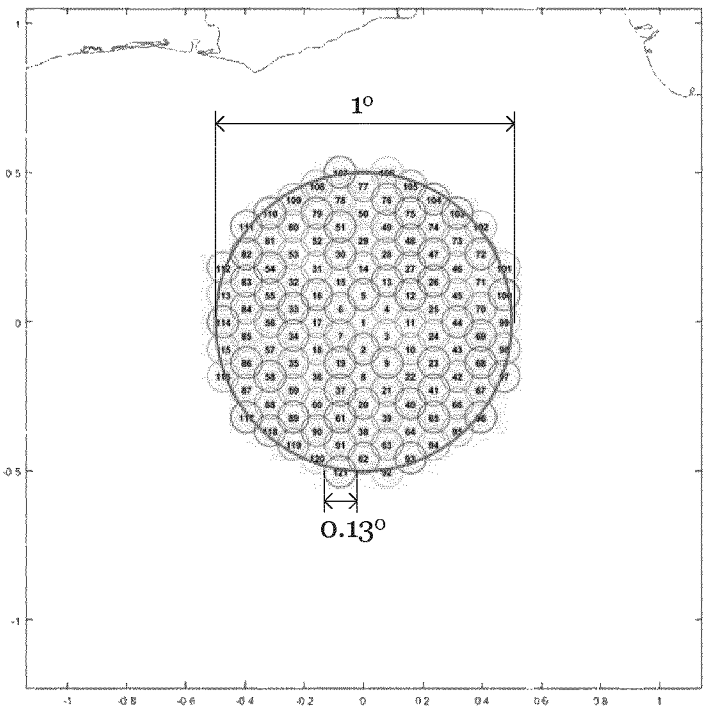
FIG. 5 illustrates the terrestrial coverage achieved using the scheme illustrated in FIG. 4.
Figure 5B:
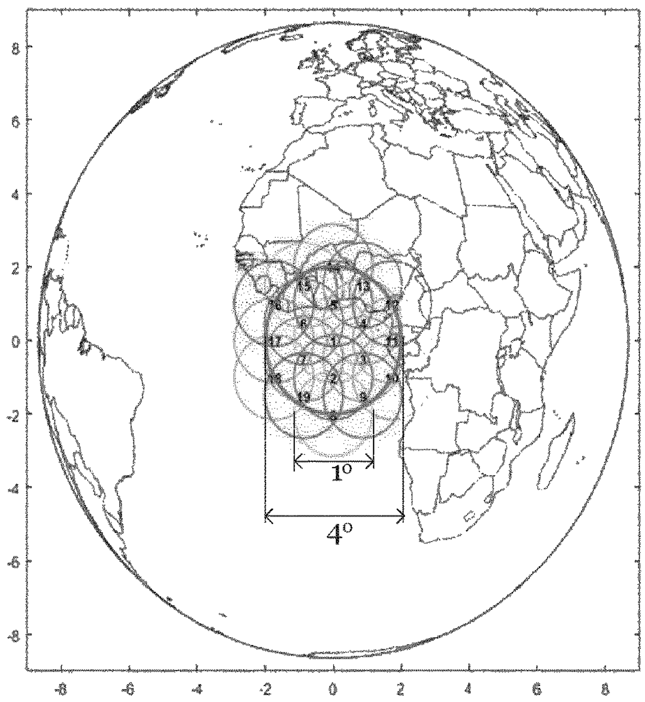
Figure 5C:
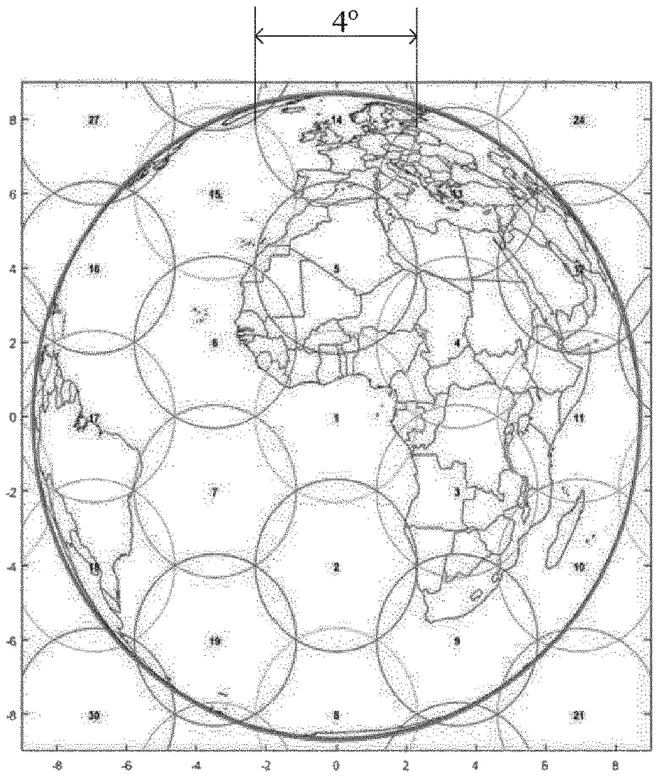

The reflector is mechanically steered to provide a further 4° diameter coverage area, and the element-level and subarray-level control is repeated. Mechanical steering is continued until a desired coverage area is filled, which may be the whole Earth in some embodiments. The principle of the build-up of coverage in this manner is shown in FIG. 4, with FIG. 5(*a*) showing an example of how a 1° diameter beam coverage area can be populated with 121 0.13° width beams. FIG. 5(*b*) shows how a 4° diameter directional coverage area could be populated with 19 1° diameter circles, and FIG. 5(*c*) shows how the Earth could be covered with different 4° diameter directional coverage areas. Elevation and azimuthal angles are shown on each of the x-axis and the y-axis respectively.

The two degrees of freedom represented by the reconfigurability described above, combined with the use of the parabolic reflector, brings new advantages to antenna performance not seen in conventional systems. The beams produced may be reconfigured such that their radiation pattern is optimised in terms of carrier to interference ratio (C/I) across the coverage area, and higher directivity is provided by the reflector magnification factor.

The result is that an antenna according to embodiments of the present invention can be considered as a very high throughput satellite (VHTS) antenna. Although specific dimensions are described in accordance with the embodiments described above, it will be appreciated that shape and dimensions of the reflector, the DRA, the spacing therebetween, and the arrangement of the subarrays, the width of the directional coverage area, the beam coverage area, and the width of the narrow beams can be varied in accordance with system requirements, and fully global coverage, with more than 36,000 non-simultaneous narrow, high gain beams, can be achieved.

In a single feed-per-beam scenario, for example, an antenna according to an embodiment of the invention may have a reduced number of apertures in comparison with a comparative array-fed antenna, which may require three or four reflectors to achieve the same coverage. An array-fed antenna is associated with degradation of the is beams at the edge of the coverage area due to the distance of the feeds from the focus of the parabola. In addition, the separation of adjacent beams is limited due to the size of the feed horns in the array, such that there can be a problem of overlapping feeds when beams are required to be closer. Multiple reflectors would be used conventionally for contiguous beams, but this can be avoided in embodiments of the present invention through subarray steering by the digital beam forming network, such that only a single reflector is required.

An antenna as described with reference to FIGS. 1 to 5 can be tested using tools such as GRASP from TICRA. Test results are described below, for the example of a transmission frequency of 19.7 GHz, although a similar configuration could also be used for reception testing. The test results are described in connection with the beam coverage area and the directional coverage area described in FIG. 4.

Figure 6A:
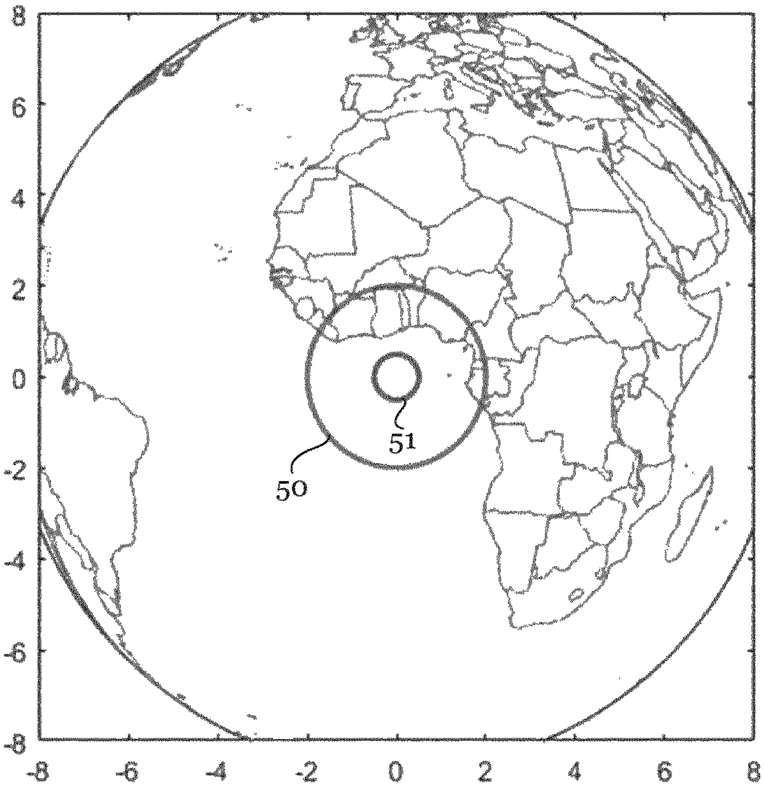
FIG. 6 shows examples of beam direction achieved using the scheme illustrated in FIG. 4.
Figure 6B:
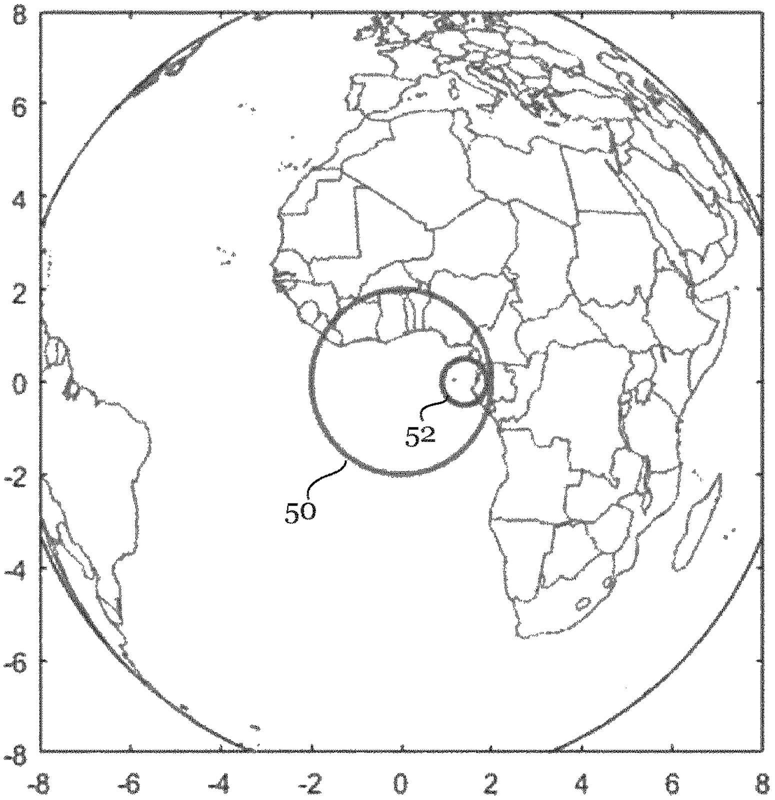
Figure 6C:
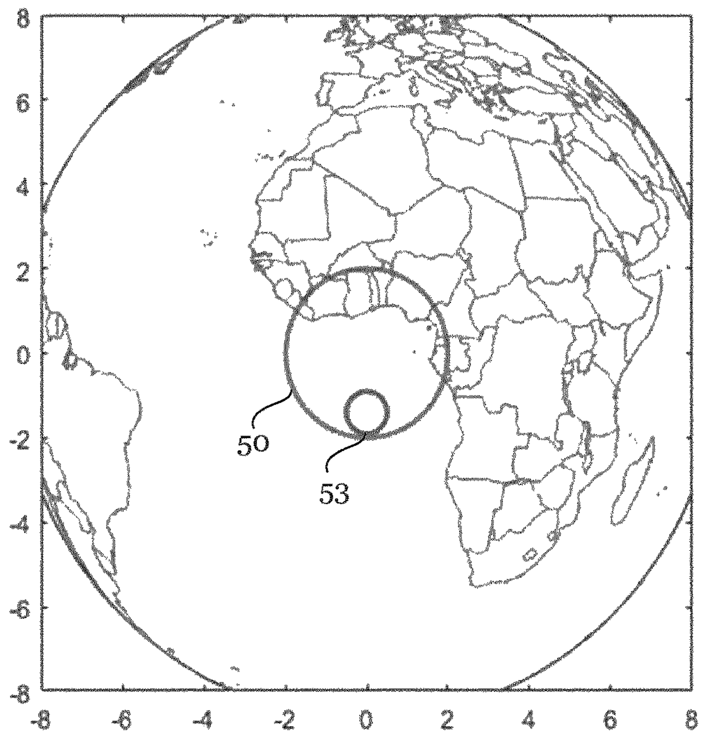
Figure 7A:
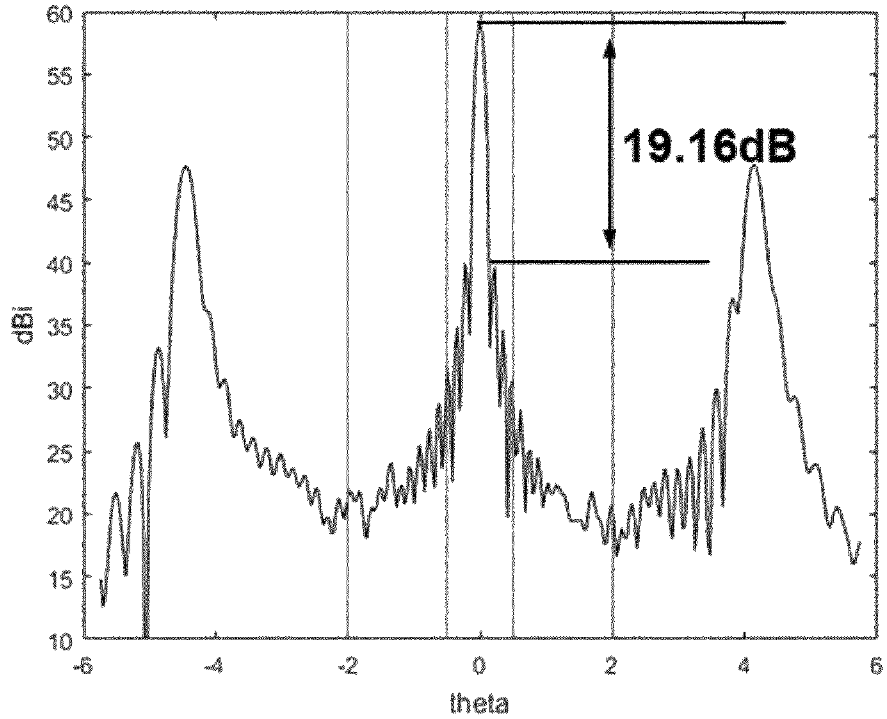
FIG. 7 shows the elevation cut of radiation patterns achieved according to results of a test of an embodiment of the present invention.
Figure 7B:
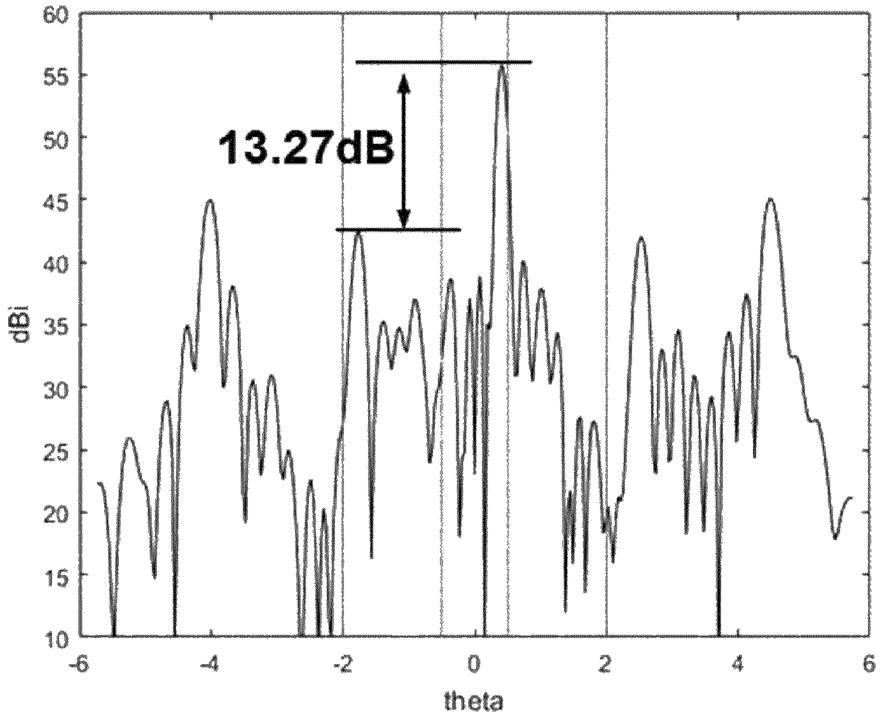
Figure 7C:
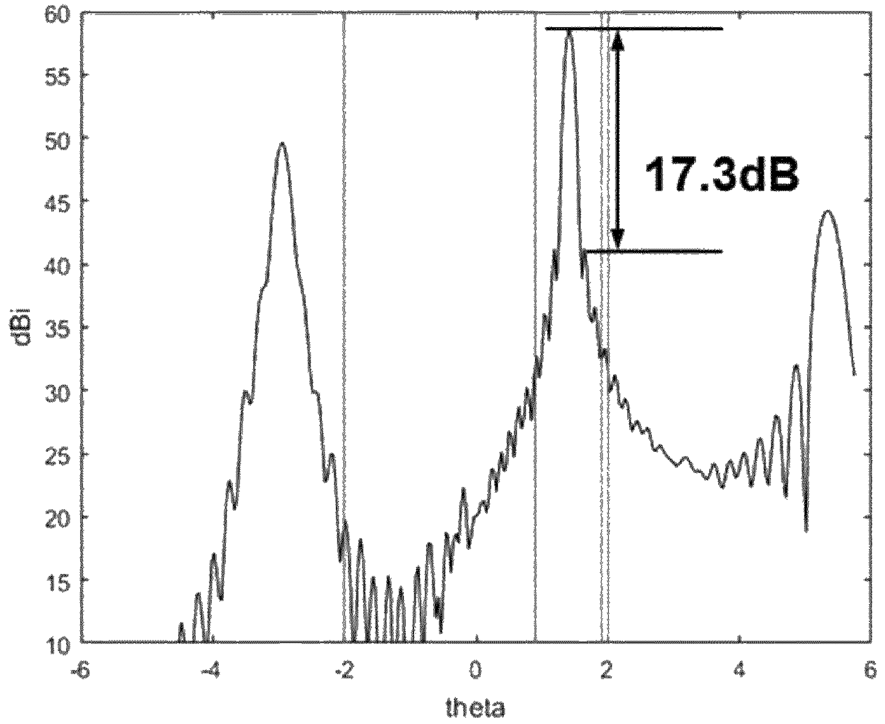
Figure 7D:
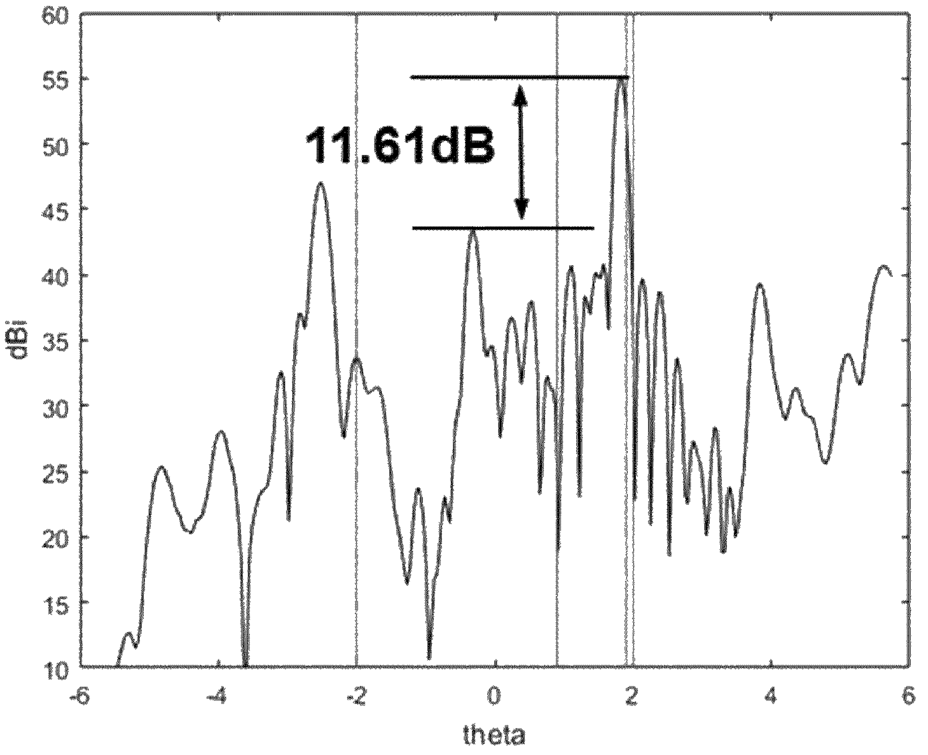

FIG. 6(*a*) shows a beam coverage layout with no pointing in either the azimuthal or elevation directions such that the pointing direction 51 of the beam is along the boresight of a directional coverage area 50 centred on (0°, 0°), i.e. elevation angle θ is zero and azimuthal angle φ relative to the boresight direction.

FIG. 6(*b*) shows a beam coverage layout with a pointing direction (θ, φ) of (1.4°, 0°). The shifting of the beam coverage area in the elevation direction is represented by the rightward shift of the beam coverage area 52, while the directional coverage area 50 is unchanged.

FIG. 6(*c*) shows a beam coverage layout with a pointing direction (θ, φ) of (0°, 1.40°). The shifting of the beam coverage area in the azimuthal direction is represented by the downward shift of the beam coverage area 53, while the directional coverage area 50 is unchanged.

FIG. 7(*a*) shows the elevation cut of the directivity of the radiation pattern in dBi with respect to elevation angle θ when the antenna points to the boresight, i.e. the pointing direction has θ=0°, and azimuthal angle φ=0° relative to the boresight direction. A side-lobe level (SLL) within the field-of-view, with respect to the maximum directivity of 19.16 dB is achieved.

In the following tests, the weighting coefficients are defined to maximize the directivity in a certain pointing direction and FIG. 7(*b*) shows the elevation cut of the radiation pattern when the elevation direction is adjusted at element level by θ=0.4° from the boresight, but with no azimuthal adjustment (φ=0°) such that the elements of the subarrays are pointing at (0.4°, 0°). No sub-array adjustment is performed to achieve the results shown in FIG. 7(*b*) configuration. The SLL is decreased to 13.27 dB.

FIGS. 7(*c*) and 7(*d*) show the same cut as illustrated in FIGS. 7(*a*) and 7(*b*) but with a larger element-level shift to (1.4°, 0° , and with sub-array level shifting of (1.4°, 0°) and (1.8°, 0°) respectively. As described above, the element-level shifting moves the position of the beam coverage area within the directional coverage area, while the sub-array level shifting results in the optimisation of the narrow beams within the 1° circle.

The side lobe level with respect to the maximum directivity decreases by approximately 6 dB in the cases where the subarray elements and the array are pointing to different directions within the 1° coverage, in other words a 6 dB reduction is seen in the test results between the radiation pattern of FIGS. 7(*a*) and 7(*b*), and a 6 dB reduction between the radiation pattern of FIGS. 7(*c*) and 7(*d*).

Table 1 summarises the results, where $\theta_s$,$\varphi_s$ represent subarray-level elevation and azimuthal offset, and $\theta_a$,$\varphi_a$ represent element-level offsets.

TABLE 1

Pointing direction test result comparison

| Pointing direction {($\theta_a$, $\varphi_a$) ($\theta_s$, $\varphi_s$) } | Maximum Directivity (dBi) | SLL within the field of view (dB) |
|---|---|---|
| {(0.0°, 0.0°), (0.0°, 0.0°)} | 59.12 | 19.16 |
| {(0.0°, 0.0°), (0.4°, 0.0°)} | 55.78 | 13.27 |
| {(1.4°, 0.0°), (1.4°, 0.0°)} | 58.54 | 17.3 |
| {(1.4°, 0.0°), (1.8°, 0.0°)} | 55 | 11.61 |

Aside from the SLL comparison, another parameter of interest in the radiation pattern relates to the grating lobes. The association of grating lobes in the field of view of the radiation pattern with phased array antennas is well known, and arises due to the periodicity of the array elements. In embodiments of the present invention, the grating lobes can be reduced significantly by the use of irregular elements in the DRA. In FIG. 2, the DRA is shown employing polyomino tiling, using 'L'-shaped elements.

In each of FIGS. 7(*a*), 7(*b*), 7(*c*) and 7(*d*), grating lobes are shown outside of the θ=±2° field of view. The randomization in the feed layout produced by the non-periodic polyomino shapes spreads out the energy of the grating lobes.

In alternative embodiments, the DRA subarrays may be arranged as irregular shapes other than an 'L'-shape, such as a 'T'-shape, in which a rectangular or square array of the required size can be formed from a tessellation of arbitrary or randomly-orientated subarrays.

Figure 8A:
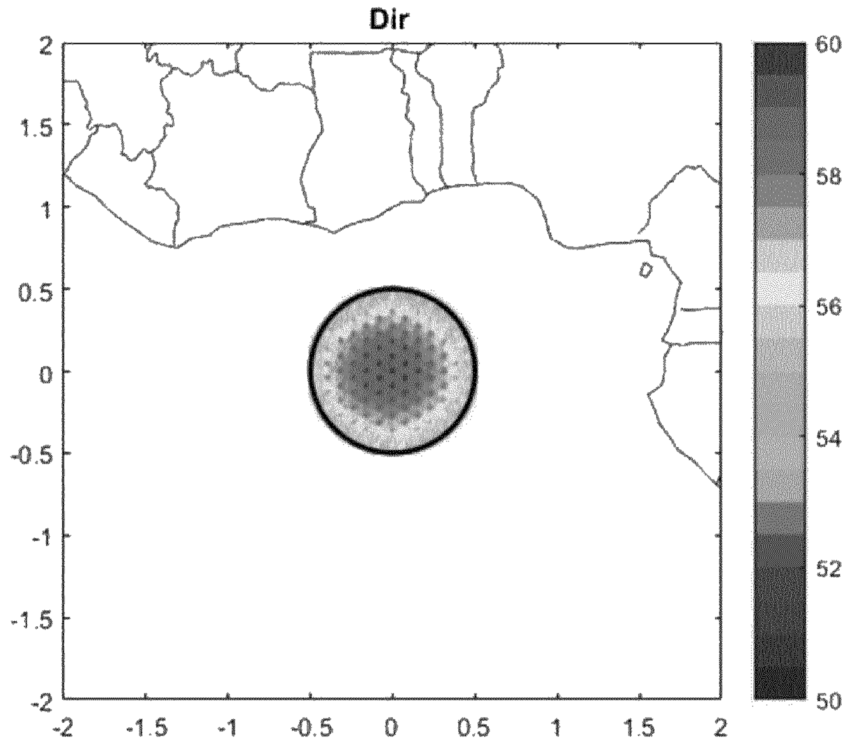
FIG. 8 shows the directivity of narrow beams obtained according to results of a test of an embodiment of the present invention.
Figure 8B:
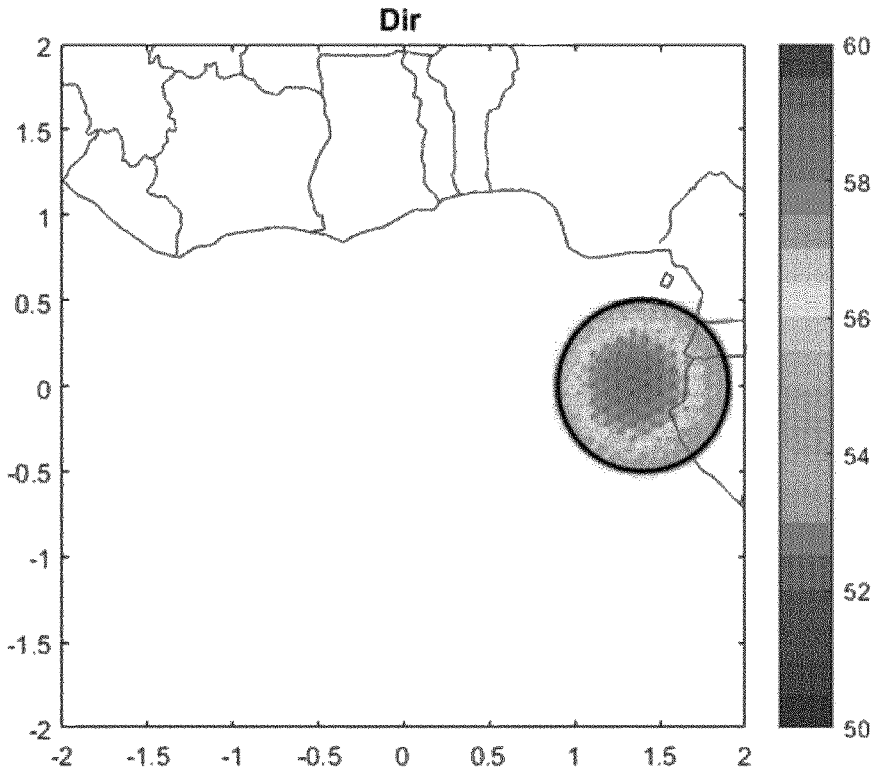
Figure 8C:
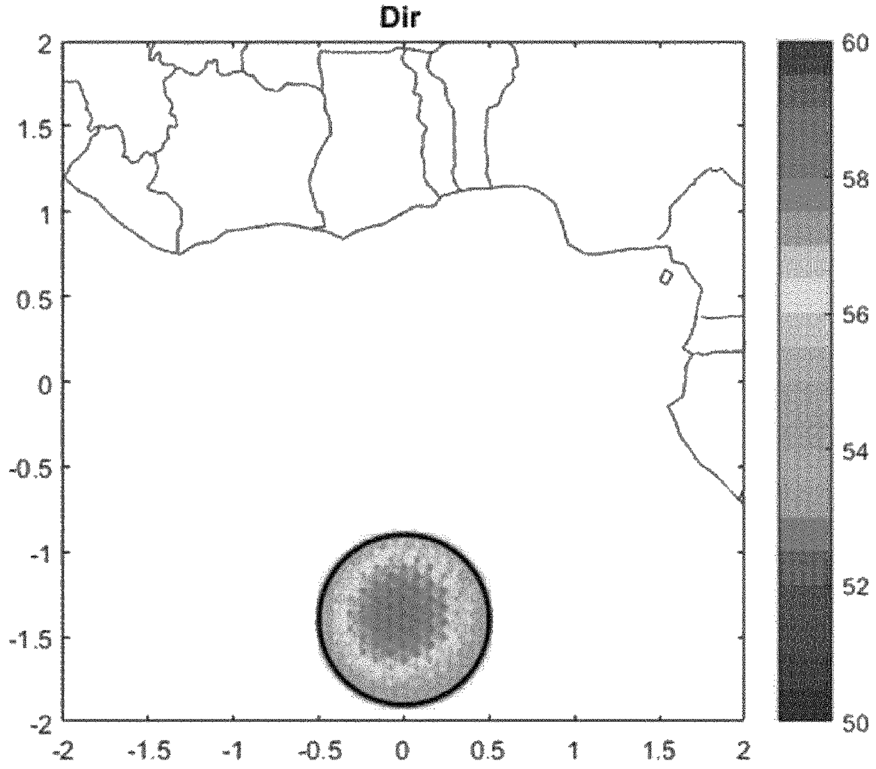

FIG. 8 shows the directivity within a 4° degree directional coverage area centred at (θ, φ)=(0°, 0°) of a plurality of narrow 0.13° beams obtained according to the test performed above. Elevation is shown on the x-axis, and azimuth is shown on the y-axis.

In FIG. 8(*a*), element-level and subarray-level steering are performed such that the 1° coverage beam is also centred at (0°, 0°).

In FIG. 8(*b*), element-level and subarray-level steering are performed such that the 1° coverage beam is centred at (1.4°, 0°).

In FIG. 8(*c*), element-level and subarray-level steering are performed such that the 1° coverage beam is centred at (0°, −1.40°).

In each example, it can be seen that high directivity is achieved in each of the narrow beams across the majority of the 1° beam coverage area. As mechanical steering of the reflector is added, it becomes possible to cover the whole Earth with high gain narrow beams.

Using a large parabolic reflector fed with a DRA implemented with an array of polyomino-shaped subarrays arranged with a random orientation enables a high number of highly directive beams to cover the whole Earth. High-capacity services are made possible with minimum signal degradation at the edge of the coverage area, with grating lobes kept out of the area of interest.

It will be appreciated that a number of variations to the embodiments described above may be made without departing from the scope of the invention defined by the claims.

The invention claimed is:

1. A multibeam antenna comprising:

a direct radiating array, DRA, comprising a plurality of subarrays of radiating elements;

a single reflector arranged to reflect signals radiated from all of the plurality of subarrays of radiating elements of the DRA in a transmission mode and to reflect signals to the DRA in a reception mode;

an analogue beam forming network for controlling the radiating elements of the plurality of subarrays and for directing a beam coverage area within a directional coverage area, wherein the beam coverage area comprises a plurlity of narrow beams; and a digital beam forming network for controlling each of the plurality of subarrays and for optimising a direction of each of the plurality of narrow beams within the beam coverage area, wherein each subarray of the plurality of subarrays receives, as an input, one control output from the digital beam forming network, applying phase and gain coefficients, such that each of the plurality of narrow beams corresponds to a respective subarray of the plurality of subarrys, and wherein the analogue beam forming network controls the radiating elements to direct the plurality of narrow beams to a center of the beam coverage area, and the digital beam forming network controls the plurality of subarrays to repoint the plurality of narrow beams to the direction within the beam coverage area which optimizes performance in directivity and carrier/interference ratio.

2. The multibeam antenna according to claim 1 wherein each subarray of the plurality of subarrays comprises a plurality of elements grouped to form a polyomino-shape.

3. The multibeam antenna according to claim 2, wherein each subarray of the plurality of subarrays has a non-rectangular shape, and has an arbitrary orientation, wherein the plurality of subarrays are arranged to form a rectangular shape.

4. The multibeam antenna according to claim 1, comprising mechanical steering means for repositioning the reflector.

5. The multibeam antenna according to claim 1 comprising a feed array between the DRA and the reflector comprising a plurality of feed horns, each of which is activated simultaneously.

6. The multibeam antenna according claim 2, comprising mechanical steering means for repositioning the reflector.

7. The multibeam antenna according claim 3, comprising mechanical steering means for repositioning the reflector.

8. The multibeam antenna according to claim 2 comprising a feed array between the DRA and the reflector comprising a plurality of feed horns, each of which is activated simultaneously.

9. The multibeam antenna according to claim 3 comprising a feed array between the DRA and the reflector comprising a plurality of feed horns, each of which is activated simultaneously.

10. The multibeam antenna according to claim 4 comprising a feed array between the DRA and the reflector comprising a plurality of feed horns, each of which is activated simultaneously.

11. The multibeam antenna according to claim 6 comprising a feed array between the DRA and the reflector comprising a plurality of feed horns, each of which is activated simultaneously.

12. The multibeam antenna according to claim 7 comprising a feed array between the DRA and the reflector comprising a plurality of feed horns, each of which is activated simultaneously.

* * * * *